United States Patent [19]
Yurimoto et al.

[11] Patent Number: 5,450,343
[45] Date of Patent: Sep. 12, 1995

[54] VEHICLE-NAVIGATION DEVICE

[75] Inventors: Masayuki Yurimoto, Toyota; Kenji Tamura, Yokohama, both of Japan

[73] Assignees: Matsushita Electric Industrial Co., Ltd., Kadoma; Toyota Jidosha Kabushiki Kaisha, Touota, both of Japan

[21] Appl. No.: 137,911

[22] Filed: Oct. 19, 1993

[30] Foreign Application Priority Data

Oct. 28, 1992 [JP] Japan .................................. 4-289979

[51] Int. Cl.⁶ ............................................ G06F 165/00
[52] U.S. Cl. .................................. 364/449; 364/444; 340/990; 340/995
[58] Field of Search ................ 364/443, 444, 449; 73/178 R; 340/988, 990, 995

[56] References Cited

U.S. PATENT DOCUMENTS

| | | | |
|---|---|---|---|
| 4,608,656 | 8/1986 | Tanaka et al. | 364/443 |
| 4,675,676 | 6/1987 | Takanabe et al. | 364/449 |
| 4,677,563 | 6/1987 | Itoh et al. | 364/449 |
| 4,689,747 | 8/1987 | Kurose et al. | 364/449 |
| 5,084,822 | 1/1992 | Hayami | 364/449 |
| 5,121,326 | 6/1992 | Moroto et al. | 340/995 |
| 5,212,643 | 5/1993 | Yoshida | 364/449 |
| 5,274,387 | 12/1993 | Kakihara et al. | 364/449 |
| 5,293,163 | 3/1994 | Kakihara et al. | 364/449 |

FOREIGN PATENT DOCUMENTS

| | | |
|---|---|---|
| 3905493 | 8/1990 | Germany . |
| 4118603 | 12/1991 | Germany . |
| 4118606 | 12/1991 | Germany . |
| 1196513 | 8/1989 | Japan . |
| 2140788 | 5/1990 | Japan . |
| 4123084 | 4/1992 | Japan . |

OTHER PUBLICATIONS

"Electrical-Visual", Toyota Mark II: Guide of New--Model Car, Oct. 1992, pp. 6–113.

*Primary Examiner*—Gary Chin
*Attorney, Agent, or Firm*—Cushman, Darby & Cushman

[57] ABSTRACT

A vehicle-navigation device for displaying a map at such a scale as to display a present position of a vehicle and a predetermined point when the vehicle does not travel on a preset route, whereby information is given to a driver. When the vehicle is led from a starting point to a route search beginning point, the scale of the map is set by a scale change section 26a so as to display the present position (the starting point) and the search beginning point on one screen. Furthermore, when the vehicle deviates from the route for a certain reason, the present position and the nearest point on the route are displayed on the same screen. In addition, when the vehicle is traveling between a search ending point and a destination point, these two points are displayed on the same screen.

16 Claims, 6 Drawing Sheets

VEHICLE-NAVIGATION DEVICE

BACKGROUND OF THE INVENTION (i) Field of the Invention

The present invention relates to a vehicle-navigation system which is mounted on a vehicle and which navigates a vehicle to a destination along a route with the aid of an image display or the like.

(ii) Description of the Prior Art

In order to reduce the load of a driver during driving, various navigation devices have been investigated, and some devices have already been mounted on vehicles. Among these devices, there is a vehicle-navigation device for leading a vehicle to a destination along a route. This vehicle-navigation device has a mechanism for informing the driver of a route to be selected at a junction, such as an intersection. The device which is nowadays put to practical use is an image display device attached to an instrument panel of the vehicle, whereby the driver is informed of the route.

In such a vehicle-navigation device, a scale for a map display is set by a driver of a vehicle to display the map at the desired scale. However, setting the scale must be done by the driver, and each time the vehicle gets closer to the destination and more detailed information is required, scaling up of the map (the enlargement of the map) must be carried out by the driver.

Japanese Patent Laid-open No. 123084/1992 describes a device for automatically carrying out such an adjustment of the scale as mentioned above. In this device, the scale of the map display can be set so as to display a present position and a destination together.

However, in the conventional device, the map must be scaled down in order to display a starting point and a destination point together, when these two points are a large distance away from each other. Therefore, when the vehicle is near to the starting point, the driver must change the scale manually so as to scale up the map.

Furthermore, in searching the route, the number of roads to be searched is limited by the capacity of a memory and a processing speed. For this reason if even narrow roads are searched, it is necessary to memorize such narrow roads, and a long period of time is required to search the narrow roads. In general, the roads to be searched are limited to trunk roads such as superhighways, toll roads, national roads and prefectural roads. Therefore, if no trunk road is present in the vicinity of the starting point, a route search can begin at a point that is distant from the starting point on occasions. In a case, the conventional device displays the map at such a low scale so as to include the destination. However, the route from the present position to the route search beginning point is required by the driver, but in the conventional device, the scale of the map is so low that the above-mentioned route cannot be easily recognized.

SUMMARY OF THE INVENTION

The present invention has achieved a solution to the above-mentioned problems, and an object of the present invention is to provide a vehicle-navigation device and a vehicle-navigation method for displaying a staring point and a route search beginning point at the highest possible scale.

Another object of the present invention is to provide a vehicle-navigation device and a vehicle-navigation method for displaying two points, namely a route search ending point and a destination point, at the highest possible scale.

Still another object of the present invention is to provide a vehicle-navigation device and a vehicle-navigation method for displaying a part of the searched route and a present position at the highest possible scale, when the vehicle is traveling off the searched route.

In order to achieve the above-mentioned objects, the vehicle-navigation device of the present invention comprises a means for inputting a starting point, a means for inputting a destination point, a means for setting a search beginning point and a search ending point on the basis of the starting point and the destination point, and searching a route between the beginning point and the ending point, a display means for displaying a map, a means for Judging that the present position of the vehicle deviates from the searched route, a means for changing the scale of the map so as to display the present position of the vehicle and a predetermined point on one screen on the basis of the judgement of the route deviation judging means and a means for indicating that display of the map is at a changed scale in the display section.

According to another embodiment of the present invention, a vehicle-navigation method of the present invention comprises a step of inputting a starting point, a step of inputting a destination point, a step of setting a search beginning point and a search ending point on the basis of the starting point and the destination point, and searching a route between the beginning point and the ending point, a step of displaying a map, a step of judging that the present position of the vehicle deviates from the searched route, a step of changing the scale of the map so as to display the present position of the vehicle and a predetermined point on the route on the same screen, when it is judged that the vehicle deviates from the route, and a step of indicating that display of the map is at the changed scale on the display.

Particularly, in the case that the vehicle is traveling off the searched route, the scale is changed so as to display the present position and a part of the above-mentioned route on the same screen. This display permits the driver to easily return to the searched route.

In the case that a means for detecting the passage of the above-mentioned search beginning point is provided, before the passage of the search beginning point has been detected, the scale of the map is changed so as to display for including both the present position and the search beginning point on the same screen. With this display, the driver can confirm the whole route from the starting point to the search beginning point on the screen.

In the case that a means for detecting the passage of the above-mentioned search ending point is provided, after the passage of the search ending point has been detected, the scale of the map is changed so as to display the present position and the destination point on the same screen. The driver can confirm the whole route from the present position to the destination point in accordance with this display, even after the vehicle has reached the search ending point.

Furthermore, in the case that a means for detecting the approach of the vehicle to a predetermined point in the vicinity of the route search ending point is provided, the course of the vehicle is regarded as route deviation in the case that the approach to the search ending point is detected, and as a result, the scale of the map is changed so as to display the present position and the destination point on the same screen. The driver can confirm beforehand the route from the search ending point to the destination point in accordance with this display.

DESCRIPTION OF THE PREFERRED EMBODIMENT

Now, the present invention will be described in detail with reference to suitable embodiments.

Figure 1:
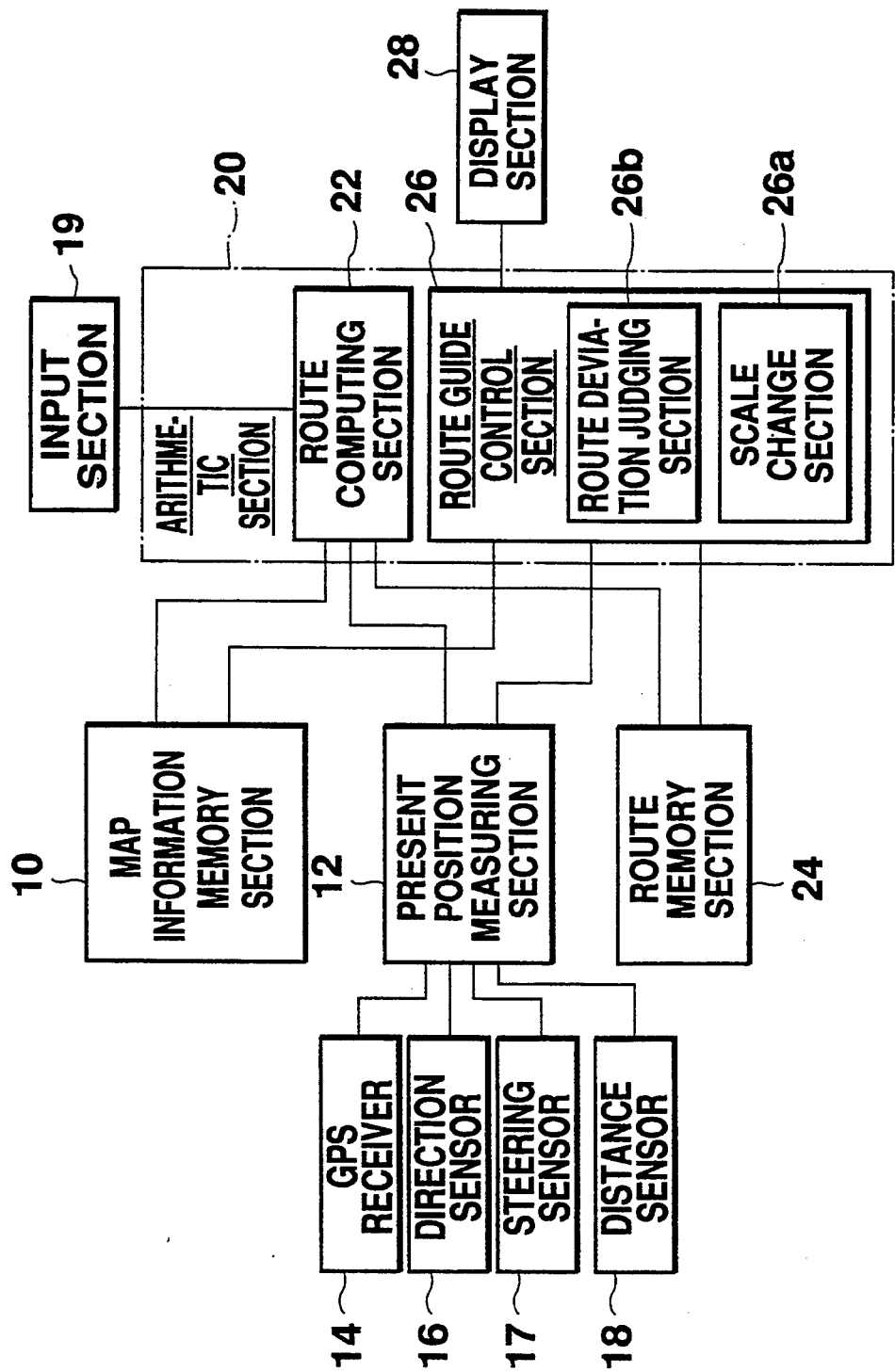
FIG. 1 is a block diagram of a suitable embodiment of a device of the present invention.

FIG. 1 shows a block diagram illustrating a device of the present invention. This device is provided with a map information memory section 10 for memorizing roads, place names, building names, river names and the like, and the memorized map information can be read out, as needed.

In this map information memory section, maps are memorized at a plurality of scales, and the kind and the accuracy of memorized information varies with these scales. For example, in the map at a low scale, only trunk roads are displayed, and in the map at a high scale, narrow roads such as back streets and the like are also displayed together with the trunk roads. Of these maps having the different scales, the map at a proper scale can be selected and displayed on a display device by the indication of a driver or under predetermined conditions.

Additionally, there is provided a GPS receiver 14 utilizing a global positioning system (hereinafter referred to as "GPS") for measuring the current position of a vehicle, a direction sensor 16 for detecting a driving direction of the vehicle on the basis of the earth's magnetism, a steering sensor 17 for detecting a change in course from a steering angle of the steering mechanism, and a distance sensor 18 for detecting a mileage from the number of wheel revolutions. On the basis of the detected results of these sensors, a present position measuring section 12 determines the present position of the vehicle.

In order to lead the vehicle to a destination point along a route, the destination point is input in an input section 19 by indicating the destination point or a place name on a screen in an undermentioned display section. Then, intersections on a searched road which are nearest to the present position point (starting point) and the input destination point are set as a route search beginning point and a route search ending point. A route from the route search beginning point to the search ending point is computed by a route computing section 22 contained in an arithmetic section 20, and the computed route is memorized in a route memory section 24. Such a limitation of the road to be searched permits curtailing of the capacity of a memory and a processing time of the arithmetic section. After the destination point is input and the route is decided, the vehicle is actually guided. A route guide control section 26 contained in the arithmetic section 20 reads the map information from the present position to the destination point from the map information memory section 10, whereby the map is displayed on a display section 28 so that the present vehicle position/driving direction and the route memorized in the route memory section 24 may be superimposed upon the map.

Figure 2:
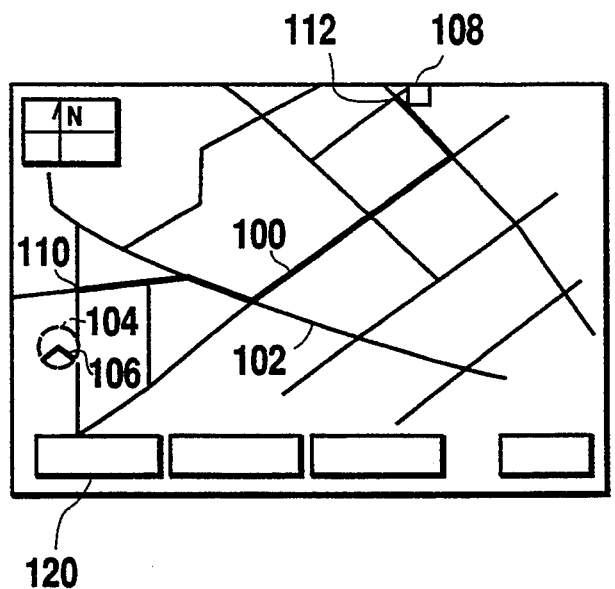
FIG. 2 is an exemplary display of the device of the present embodiment, and in this display, the whole route from a present position to a destination point is shown.

The display section 28 is provided in an instrument panel in the vicinity of a driver's seat, and the driver can confirm the position of the vehicle and get the information of the subsequent route by looking at this display section 28. One example of this display is shown in FIG. 2. The selected route in FIG. 2 is denoted by a thick solid line 100, and other roads are denoted by thin solid lines 102. The position of the vehicle is denoted by a circular symbol 104, and the driving direction is denoted by a wedge-shaped arrow 106. Furthermore, a destination point 108 is denoted by "□". In this display, the route search beginning point is represented by an intersection 110 and the ending point is represented by an intersection 112. A road in the vicinity of the present position is not searched, and as described above, the intersection 110 of the searched road nearest to the present position point is the route search beginning point.

In this case, the scale of FIG. 2 is too small to make it possible to understand the route to the intersection 110 which is the route search beginning point. Thus, in the device of the present invention, it is judged by a route deviation judging section 26b that the present position of the vehicle is not present on the searched route. When this judgement has been made, the scale is changed by a scale change section 26a so that the searched route nearest to the present position may be displayed on one screen, whereby an enlarged view is displayed on the display device. In FIG. 2, the present position is the starting point, and a point on the searched route nearest to this point is the search beginning point. The information of the detailed road from the starting point to the route search beginning point is shown in an enlarged view of FIG. 3. In this display, if a practical distance between the present point 104 and the search beginning point 110 is represented by L and a length of the display screen in a longitudinal direction is represented by A, it is necessary to select a scale (1/λ) which meets the formula (1)

$$L < (A/2 - \alpha) \times \lambda \qquad (1).$$

That is, when the present position 104 is displayed in the center of the screen, the length L is required to be ½ or less of the length A of the screen in the longitudinal direction in order to display the route search beginning point 110 on the screen. However, if the search beginning point 110 lies on the edge of the screen, the position of the point 110 is less understandable, and so a slight clearance α may be given on the screen. In the scale change section 26a contained in the route guide control section 26 in FIG. 1, the scale is selected so that the present position 104 and the search beginning point 110 may be sited in the same screen in accordance with the formula 1. On the basis of the selected scale, such an enlarged view as in FIG. 3 is displayed in the display section 28.

Figure 3:
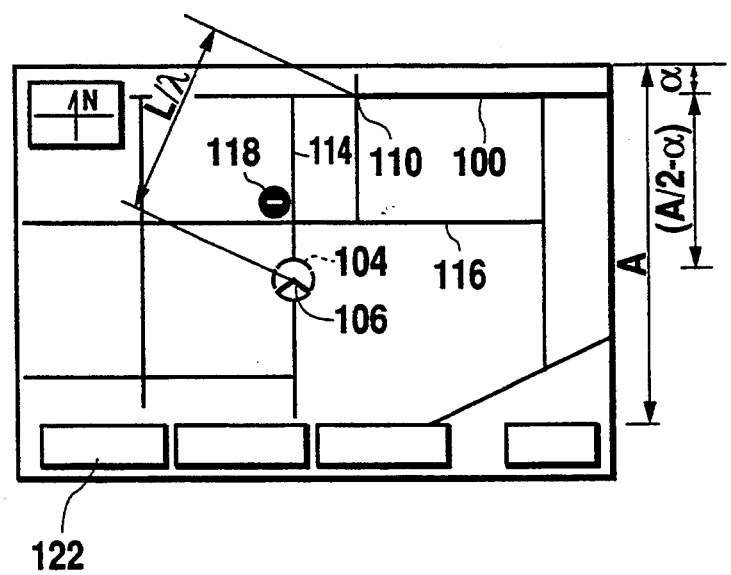
FIG. 3 is another exemplary display of the device of the present embodiment, and in this display, the route from the present position to a route search beginning point is shown in detail.

In FIG. 3, roads 114 and 116 newly appear, which are omitted in FIG. 2 owing to the low scale. On the basis of this information, the driver can select the road to the intersection 110. Furthermore, a symbol 118 indicates a restricted road 114, and it is apparent that this road 114 cannot be used.

Thus, by selecting the scale in consideration of a distance between the present position and the route search beginning point, the present position and the route search beginning point can always be displayed on the same screen, which can prevent a problem such as the deviation of the search beginning point from a display range, in the case that the enlarged view having a certain scale is displayed, the present position being sited at the center of the screen. In consequence, the driver can select the proper road without hesitation.

When the vehicle cannot travel along the guided route displayed by the device or when the vehicle deviates from the route along the way, a road along which the vehicle can return to the searched route can also be displayed, in addition to the display of the road from the starting point to the search beginning point.

Figure 4:
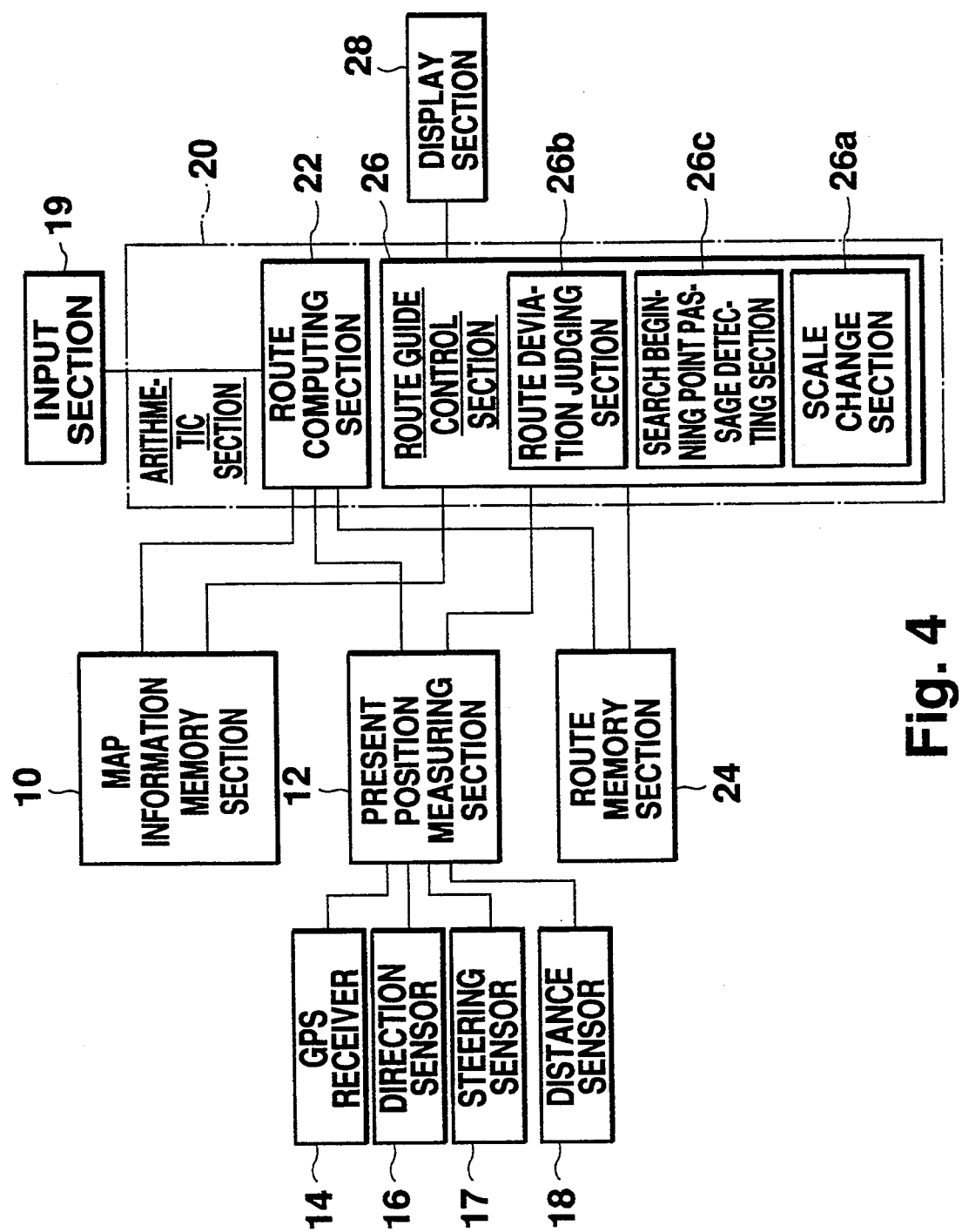
FIG. 4 is a block diagram illustrating another embodiment of the device of the present invention.

FIG. 4 shows another embodiment. In this embodiment, a search beginning point passage detecting section 26c is provided in addition to the embodiment shown in FIG. 1. The search beginning point passage detecting section is used to judge whether the vehicle is traveling from the starting point to the search beginning point or if it deviates from the searched route to make a detour. If the vehicle is traveling toward the search beginning point, the scale is changed so as to display the search beginning point and the present position on the same screen, even when there is a point nearer than the search beginning point on the searched route.

As described above, the present device can provide the driver with the detailed road information from the present position to the route search beginning point. In addition, even if the vehicle deviates from the searched route for a certain reason, the device can also provide the driver with the route along which the vehicle can return to the searched road.

Also when the vehicle has reached the ending point of the searched route, a similar problem arises, and a case can be imagined where the driver does not know a route to the destination. A device for solving such a problem is shown in FIG. 5.

Figure 5:
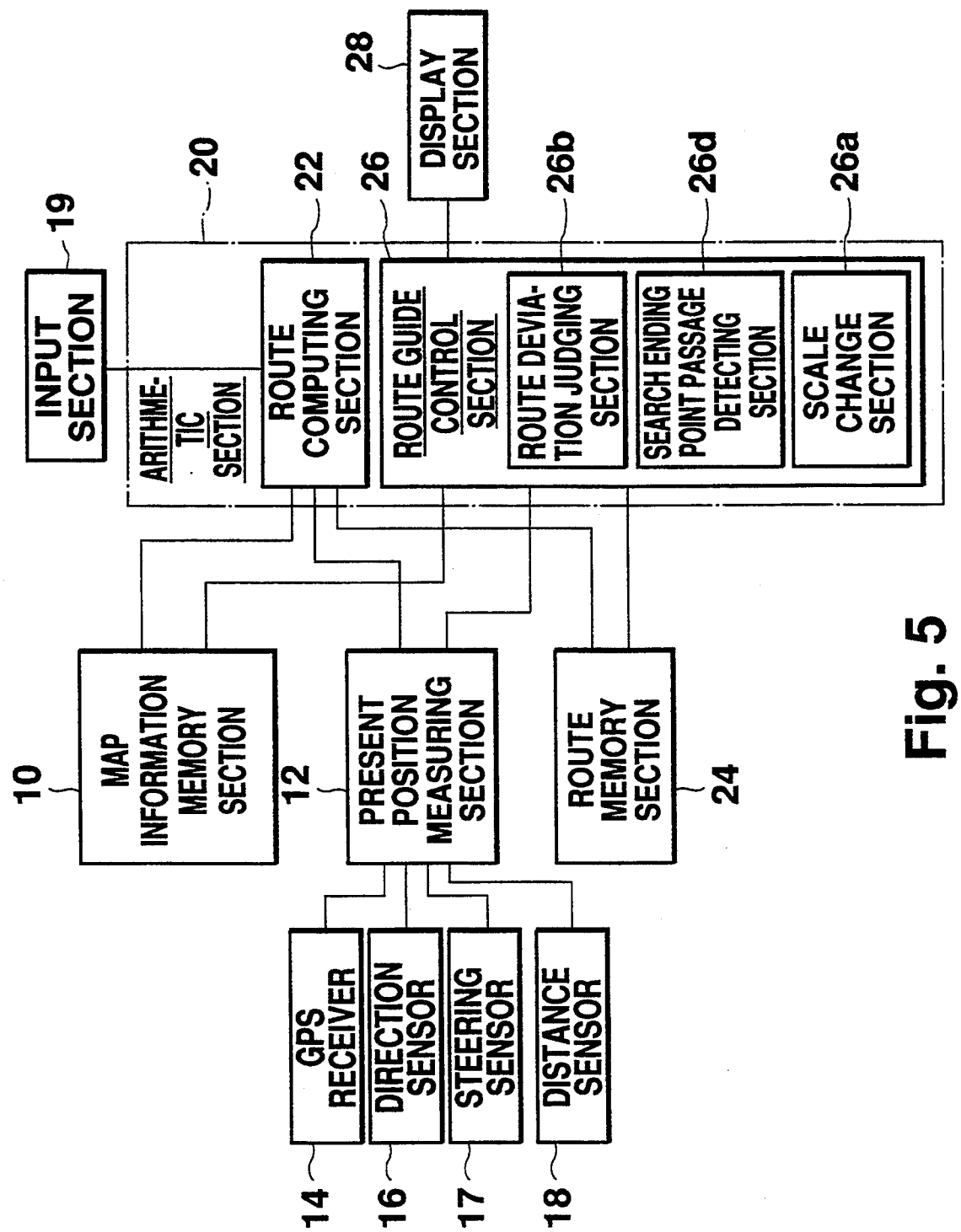
FIG. 5 is a block diagram illustrating still another embodiment of the device to the present invention.

In the device in FIG. 5, a search ending point passage detecting section 26d is provided in addition to the device shown in FIG. 1. When the passage of the search ending point has been detected by this detecting section 26d, the scale is changed so as to display the present position and the destination point on the same screen, whereby the driver can securely get the road information from the search ending point to the destination point.

Figure 6:
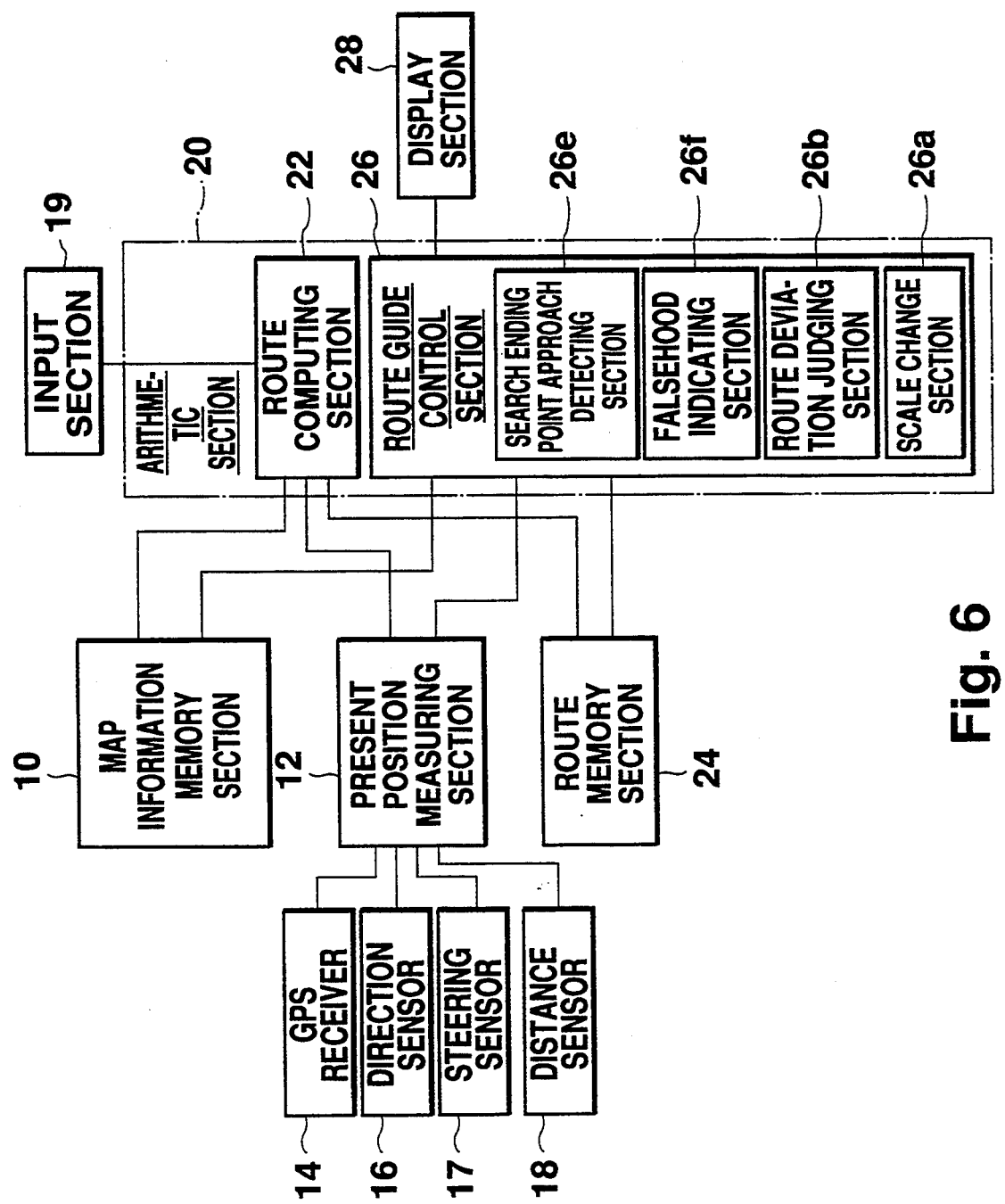
FIG. 6 is a block diagram illustrating a further embodiment of the device to the present invention.

FIG. 6 shows another embodiment for displaying the route from the route search ending point to the destination point. The embodiment of FIG. 6 further has a search ending point approach detecting section 26e and a falsehood indicating section 26f in addition to the embodiment shown in FIG. 1. In order to inform the driver in advance of the information from the search ending point to the destination point, a scale is selected so as to display the present position and the destination point on the same screen, when the vehicle has approached to a predetermined point in the vicinity of the search ending point. Accordingly, when it has been judged by the search ending point approach detecting section 26e that the vehicle is near to the predetermined point in the vicinity of the search ending point, the falsehood indicating section 26f gives, to the route deviation Judging section 26b, the false information that the vehicle has deviated from the searched road. On the basis of this false information, the route deviation judging section 26b gives the indication of scale change to the scale change section 26a, so that the scale is changed so as to display the present position, the search ending point and the destination point on the same screen.

Figure 7:
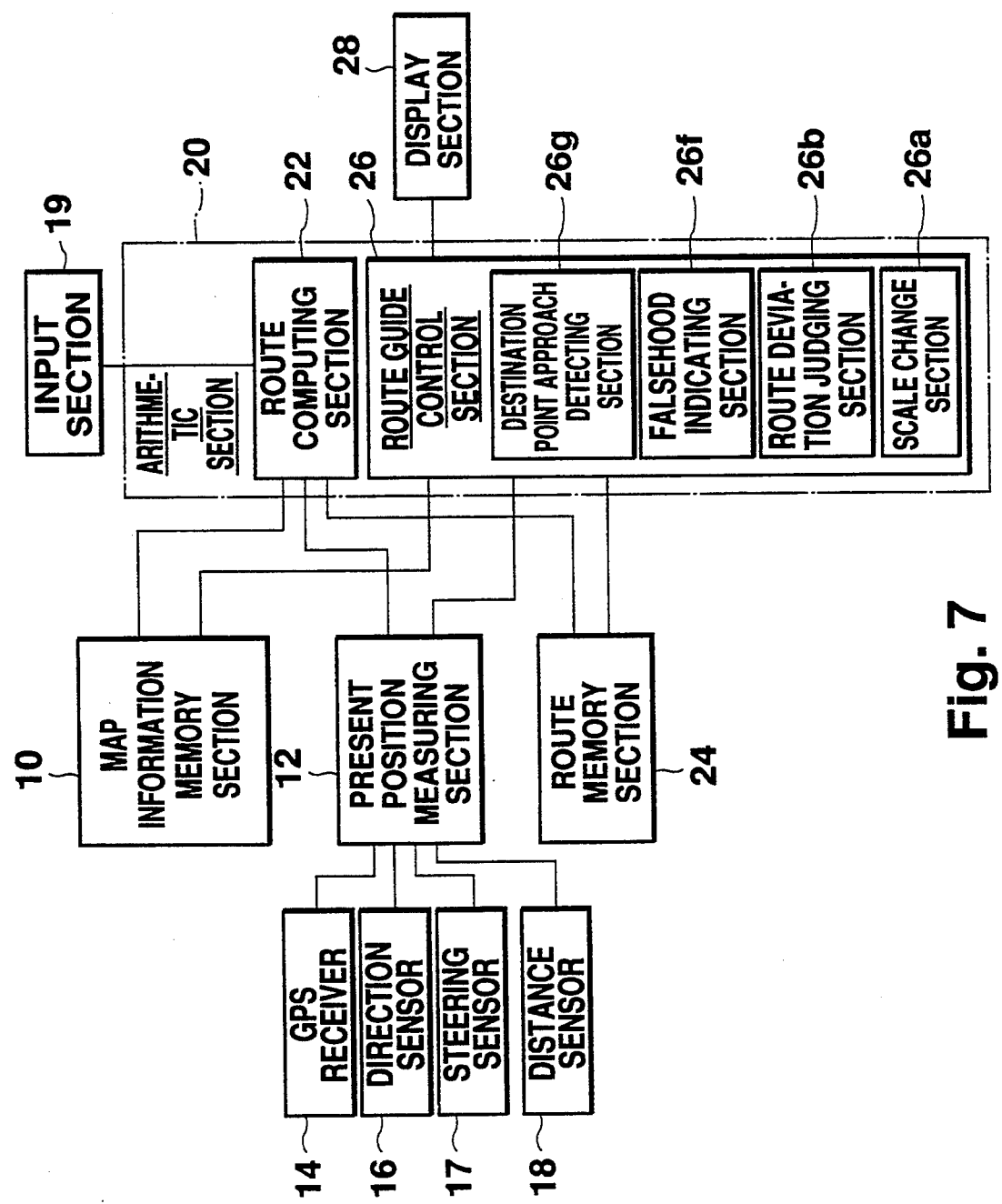
FIG. 7 is a block diagram illustrating a still further embodiment of the device to the present invention.

FIG. 7 shows still another embodiment, which informs the driver the map information of from the search ending point to the destination point, as in the embodiment shown in FIG. 6. In this embodiment, the search ending point approach detecting section 26e in FIG. 6 is replaced with a destination point approach detecting section 26g. When the vehicle approaches within a predetermined distance (e.g., 1.5 km) of the destination, the scale is automatically changed. In order to display a distance of 1.5 km, a scale of 1/40,000 is selected, in which the size of the display for the vehicle is in the range of from about 5 to 6 inches, whereby the present position and the destination point can be displayed on the same screen.

In the respective embodiments described above, when the position of the vehicle deviates from the searched route or when it is regarded that the vehicle deviates, the map can be scaled up to display the detailed map. However, indication may be given so as to display the detailed map by means of a touch switch 120 shown on the screen in FIG. 2. According to this constitution, the detailed map need only be displayed, when required by the driver. By touching a touch sensitive switch 122 in FIG. 3 at the time when the detailed map is displayed, the display can be returned to the wide area map. Furthermore, this switch is not limited to the touch switch on the screen, and it may be a switch provided on an instrument panel.

It is also preferable that the scale is automatically changed at the time of the display from the starting point to the search beginning point and the display from the search ending point or its vicinity to the destination point, and the indication of the scale change is given by means of the switch, for example, when the vehicle deviates from the searched road to make a detour.

In the respective examples described above, when it is judged that the vehicle deviates from the route or when it is regarded that the vehicle deviates from the route, the scale is changed. However, the judgement of the route deviation may be carried out every predetermined time period to change the scale at each time.

Additionally, in the exemplary display, the searched roads are distinguished from other roads by the thickness of lines, but this manner is not restrictive, and the distinction can be made by using different colors.

What is claimed is:

1. A vehicle-navigation device for navigating a vehicle by displaying a map on a screen to inform a driver of a route to be selected, the vehicle-navigation device comprising:

starting point inputting means for inputting a starting point;

destination inputting means for inputting a destination point;

route searching means for setting a search beginning point and a search ending point on the basis of the starting point and the destination point, and searching a route between the search beginning point and the search ending point;

display means for displaying the map;

route deviation judging means for judging that a present position of the vehicle deviates from the searched route;

scale changing means for changing a scale of the map so as to display the present position of the vehicle and a predetermined point on a same screen on the basis of the judgment of the route deviation judging means; and display indicating means for providing an indication of displaying the map at the changed scale in a display section of the screen.

2. The vehicle-navigation device according to claim 1, wherein the scale change means changes the scale of the map so as to display the present position and a position of the searched route nearest to the present position on one screen.

3. The vehicle-navigation device according to claim 2, wherein the display indicating means is a switch means provided in the display section or in its neighborhood.

4. The vehicle-navigation device according to claim 2, wherein the display indicating means provides the display indication on the basis of the judgement result of the route deviation judging means.

5. The vehicle-navigation device according to claim 1 further comprising search beginning point passage detecting means for detecting the passage of the search beginning point and in which, before the passage of the search beginning point has been detected by the search beginning point passage detecting means, the scale of the map is changed by the scale change means so as to display the present position and the search beginning point on one screen.

6. The vehicle-navigation device according to claim 5, wherein the display indicating means is a switch means provided in the display section of the screen or in its neighborhood.

7. The vehicle-navigation device according to claim 5, wherein the display indicating means provides the display indication on the basis of the judgement result of the route deviation judging means.

8. The vehicle-navigation device according to claim 1, further comprising search ending point passage detecting means for detecting the passage of the search ending point and in which, after the passage of the search ending point has been detected by the search ending point passage detecting means, the scale of the map is changed by the scale change means so as to display the present position and the destination point on one screen.

9. The vehicle-navigation device according to claim 8, wherein the display indicating means is a switch means provided in the display section of the display means or in its neighborhood.

10. The vehicle-navigation device according to claim 8, wherein the display indicating means provides the display indication on the basis of the judgement result of the route deviation judging means.

11. The vehicle-navigation device according to claim 1, further comprising a search ending point approached detecting means for detecting that the vehicle has approached within a predetermined distance of the route search ending point, and falsehood indicating means for providing an indication of route deviation to the route deviation judging means, when the approach to the search ending point has been detected and in which the scale of the map is changed by the scale change means so as to display the present position, the search ending point and the destination point on one screen, when the falsehood indicating means determines that the vehicle deviates from the searched route.

12. The vehicle-navigation device according to claim 1, further comprising destination point approach detecting means for detecting that the vehicle has approached within a predetermined distance of the destination point, and a falsehood indicating means for providing an indication of route deviation to the route deviation judging means, when the approach to the destination point has been detected and in which the scale of the map is changed by the scale change means so as to display the present position and the destination point on one screen, when the falsehood indicating means determines that the vehicle deviates from the search route.

13. A vehicle-navigation method for leading a vehicle by displaying a map on a screen to inform a driver of a route to be selected which comprises:

inputting a starting point;

inputting a destination point;

setting a search beginning point and a search ending point on the basis of the starting point and the destination point, and searching a route between the search beginning point and the search ending point;

displaying the map on the screen;

judging that a present position of the vehicle deviates from the search route;

changing a scale of the map when it is judged that the vehicle deviates from the route so as to display the present position of the vehicle and a predetermined point on the route on one screen and providing an indication of displaying the map at the changed scale on the screen.

14. The vehicle-navigation method according to claim 13, wherein said step of changing the scale of the map causes the present position of the vehicle and a position of the searched route nearest to the present position of the vehicle to be displayed on the screen.

15. The vehicle-navigation method according to claim 13, further comprising detecting the passage of the search beginning point and in which before the passage of the search beginning point has been detected, the scale of the map is changed in the scale change step so as to display the present position and the search beginning point on the screen.

16. The vehicle-navigation method according to claim 13, further comprising detecting the passage of the search ending point and in which after the passage of the search ending point has been detected, the scale of the map is changed so as to display the present position and the destination point on the same screen.

* * * * *